United States Patent
Hsu et al.

(10) Patent No.: US 11,098,407 B2
(45) Date of Patent: Aug. 24, 2021

(54) METHOD FOR NO-SILANE ELECTROLESS METAL DEPOSITION USING HIGH ADHESIVE CATALYST AND PRODUCT THEREFROM

(71) Applicant: NATIONAL TSING HUA UNIVERSITY, Hsinchu (TW)

(72) Inventors: Chin-Wei Hsu, Hsinchu (TW); Wei-Yen Wang, Hsinchu (TW); Tzu-Chien Wei, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 119 days.

(21) Appl. No.: 16/565,824

(22) Filed: Sep. 10, 2019

(65) Prior Publication Data
US 2020/0002817 A1 Jan. 2, 2020

Related U.S. Application Data

(63) Continuation-in-part of application No. 15/270,641, filed on Sep. 20, 2016, now abandoned.

(30) Foreign Application Priority Data

Sep. 21, 2015 (TW) .................................. 104131105
Sep. 12, 2016 (TW) .................................. 105129633

(51) Int. Cl.
*C23C 18/18* (2006.01)
*C23C 18/38* (2006.01)
*C23C 18/32* (2006.01)
*B01J 35/02* (2006.01)
(Continued)

(52) U.S. Cl.
CPC .......... *C23C 18/1893* (2013.01); *B01J 23/44* (2013.01); *B01J 33/00* (2013.01); *B01J 35/023* (2013.01);
(Continued)

(58) Field of Classification Search
CPC ... C23C 18/1893; C23C 18/639; C23C 18/38; C23C 18/32; B01J 35/023; B01J 33/00; B01J 23/44; B01J 37/0217
See application file for complete search history.

(56) References Cited

U.S. PATENT DOCUMENTS 3,011,920 A * 12/1961 Shipley, Jr. .............. H01B 1/00
106/1.11
4,301,196 A * 11/1981 McCormack ........... C23C 18/40
106/1.23
(Continued)

FOREIGN PATENT DOCUMENTS

| CN | 101740226 A | 6/2010 |
|---|---|---|
| CN | 103314135 A | 9/2013 |
| CN | 104742438 A | 7/2015 |

OTHER PUBLICATIONS

Guhathakurta et al., "Effect of Hydrofluoric Acid in Oxidizing Acid Mixtures on the Hydroxylation of Silicon Surface," J. of the Electrochemical Society, 154 (11), pp. 136-146 (2007). (Year: 2007).*

(Continued)

*Primary Examiner* — Catherine S Branch
(74) *Attorney, Agent, or Firm* — Li & Cai Intellectual Property (USA) Office (57) ABSTRACT

A method for electroless metal deposition and an electroless metal layer included substrate are provided. The method for electroless metal deposition includes steps as follows. a) cleaning a substrate, applying a hydrofluoric acid onto the substrate; and then applying a modifying agent onto the substrate to form a chemical oxide layer on the substrate; b) a catalyst layer is formed on the chemical oxide layer, wherein the catalyst layer includes a plurality of colloidal nanoparticles, and each of the plurality of colloidal nanoparticles includes a palladium nanoparticle and a polymer (Continued)

which encapsulates the palladium nanoparticle, and c) depositing a metal on the catalyst layer through an electroless metal deposition to form an electroless metal layer.

19 Claims, 9 Drawing Sheets

(51) Int. Cl.
  *B01J 33/00* (2006.01)
  *B01J 23/44* (2006.01)
  *B01J 37/02* (2006.01)
  *C23C 18/16* (2006.01)
(52) U.S. Cl.
  CPC .......... *C23C 18/1639* (2013.01); *C23C 18/32* (2013.01); *C23C 18/38* (2013.01)

(56) References Cited

U.S. PATENT DOCUMENTS

2002/0197404 A1* 12/2002 Lee .................. C23C 18/30
  427/306
2013/0295287 A1   11/2013 Tsukamoto

OTHER PUBLICATIONS

Zhang et al., "An aqueous-phase catalytic process for the selective hydrogenation of acetylene with monodisperse water soluble palladium nanoparticles as catalyst," Catal. Sc. Technol., 2012, 2, 1319-1323. (Year: 2012).*

* cited by examiner

METHOD FOR NO-SILANE ELECTROLESS METAL DEPOSITION USING HIGH ADHESIVE CATALYST AND PRODUCT THEREFROM

CROSS REFERENCE TO RELATED APPLICATION

This application is a continuation-in-part of U.S. application Ser. No. 15/270,641, filed on Sep. 20, 2016 and entitled "method for no-silane electroless metal deposition using high adhesive catalyst and product therefrom", now pending, the entire disclosures of which are incorporated herein by reference.

BACKGROUND OF THE INVENTION

1. Field of the Invention

The instant disclosure relates to a method for no-silane electroless metal deposition and a product therefrom; in particular, to a method for no-silane electroless metal deposition using a high adhesive catalyst. The instant disclosure also relates to a no-silane electroless metal layer included substrate.

2. Description of Related Art

In recent years, along with the development of the surface metallization of the printed-circuit board, the electromagnetic interference shielding of electronic instrument cases, the metallization process in the semiconductor industry, and the corrosion prevention of the oil pipe, etc., the electroless plating method has become more and more popular. Since the plating layer has the advantages such as high stiffness, wear resistance, corrosion resistance, electromagnetic shielding, and superior copper diffusion barrier effect, it is widely used in various fields. Some applications and purposes of the electroless-nickel plating are listed in Table 1 as below.

TABLE 1

Electroless-nickel plating is applied in various fields.

| Industrial Classification | Applicable Products | Purpose |
| --- | --- | --- |
| Automobile Industry | control panel, piston, cylinder, bearing, precision gear, transmission shaft, etc. | stiffness, wear resistance, corrosion resistance, precision, etc. |
| Electronics Industry | contact point, knob, outer shell, electronic product, computer product, etc. | stiffness, corrosion resistance, precision, blend property, etc. |
| Precision Machinery | photocopier, optical instrument, watch, etc. | stiffness, corrosion resistance, precision, etc. |
| Aviation and Ship Industry | hydraulic system machine, electric appliance, propeller, electric motor, duct, etc. | stiffness, wear resistance, corrosion resistance, precision, etc. |
| Chemical Industry | various valves, conveying pipe, reactor, heat exchanger, etc. | wear resistance, corrosion resistance, precision, pollution prevention, etc. |
| Others | various models, working mechanical product, vacuum mechanical product, etc. | stiffness, wear resistance, releasability, precision, etc. |

An electroless plating method is used to deposit metal on a substrate (e.g., silicon substrate) by chemical reaction, and also can deposit the metal on a metal or non-metal surface. A silicon substrate may be used as the substrate for electroless metal deposition. However, since the surface of the silicon substrate is smooth, the metal layer directly plated on the silicon substrate by a conventional method has inferior adhesion. A silane compound may be used as a bridge between organic and inorganic materials, since it contains two different functional groups. The silane compound may be used to modify the surface of silicon substrate, and may be used as an adhesive layer between the silicon substrate and a catalyst. In related arts, the colloidal nanoparticles may be used as a catalyst in an electroless metal-plating reaction, where each of the colloidal nanoparticles is composed of palladium nanoparticles and a macromolecular polymer encapsulating the palladium nanoparticles, such as PVP-Pd. Furthermore, the macromolecular polymer may bond to the modified surface of the silicon substrate. In this way, the colloidal nanoparticles can reduce the metal onto the surface of the silicon substrate to help form a metal plating layer.

However, since the silane compound itself is nonconductive, it may produces resistance at the modified surface of the semiconductor device. So the silane compound approach is not appealing to some applications, such as solar cell application. Moreover, the pretreatment steps of the silane compound may be complicated, and may increase the manufacturing time and cost.

In order to overcome the abovementioned disadvantages, the instant disclosure provides a method of no-silane electroless metal deposition using a high adhesive catalyst, and the catalyst has high adhesion property to replace the use of silane compound. By such a way, not only can the manufacturing time be shortened and the manufacturing process simplified, but also the manufacturing cost can be reduced.

SUMMARY OF THE INVENTION

A method of no-silane electroless metal deposition using high adhesive catalyst of the instant disclosure is provided to solve the abovementioned problems. There is no need to use the silane compound, so the resistance problem is resolved, and the manufacturing process also can be simplified.

An embodiment of the instant disclosure provides a method of no-silane electroless metal deposition using high adhesive catalyst. The method includes the following steps. a) cleaning a substrate, applying a hydrofluoric acid onto the substrate, and then applying a modifying agent onto the substrate to form a chemical oxide layer on the substrate; b) forming a catalyst layer on the chemical oxide layer, wherein, the catalyst layer includes a plurality of colloidal nanoparticles, and each of the plurality of colloidal nanoparticles includes a palladium nanoparticle and a polymer which encapsulates the palladium nanoparticle, and c)

depositing a metal on the catalyst layer through an electroless metal deposition to form an electroless metal layer.

The instant disclosure further provides a method for forming colloidal nanoparticles being used in no-silane electroless metal deposition. The method includes the following steps: using a precursor, a protective agent, and a reducing agent to form a plurality of colloidal nanoparticles in an alkaline environment.

The instant disclosure further provides an electroless metal layer included substrate which includes a chemical oxide layer, a catalyst layer, and an electroless metal layer. The chemical oxide layer is formed on a surface of a substrate by cleaning the substrate, applying a hydrofluoric acid onto the substrate, and then applying a modifying agent onto the substrate. The catalyst layer is disposed on the chemical oxide layer, and the catalyst layer includes a plurality of colloidal nanoparticles. Each of the plurality of colloidal nanoparticles includes a palladium nanoparticle and a polymer which encapsulates the palladium nanoparticle. The electroless metal layer is formed by conducting an electroless metal deposition to deposit a metal on the catalyst layer.

In the instant disclosure, the catalyst having high adhesion property is used to replace the silane compound in related arts in the electroless metal deposition process. The catalyst also has the function of being used as a bridge between organic and inorganic materials like the silane compound, but the catalyst does not generate much resistance like the silane compound, the instant disclosure may be used in more applications comparing to related arts. In addition, the manufacturing process may be simplified, the manufacturing time and cost may be reduced.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Embodiments disclosed in the instant disclosure are illustrated via specific examples as follows, and people familiar in the art may easily understand the advantages and efficacies of the instant disclosure by disclosure of the specification. The instant disclosure may be implemented or applied by other different specific examples, and each of the details in the specification may be applied based on different views and may be modified and changed under the existence of the spirit of the instant disclosure. The figures in the instant disclosure are only for brief description, but they are not depicted according to actual size and do not reflect the actual size of the relevant structure. The following embodiments further illustrate related technologies of the instant disclosure in detail, but the scope of the instant disclosure is not limited herein.

First Embodiment

Figure 1:
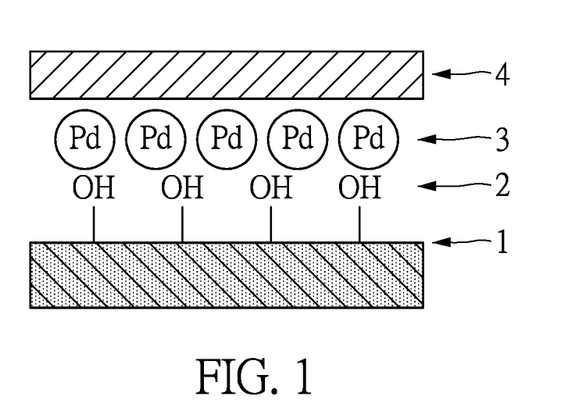
FIG. 1 shows a schematic view of a method for no-silane electroless metal deposition using high adhesive catalyst of a first embodiment in the instant disclosure.
Figure 2:
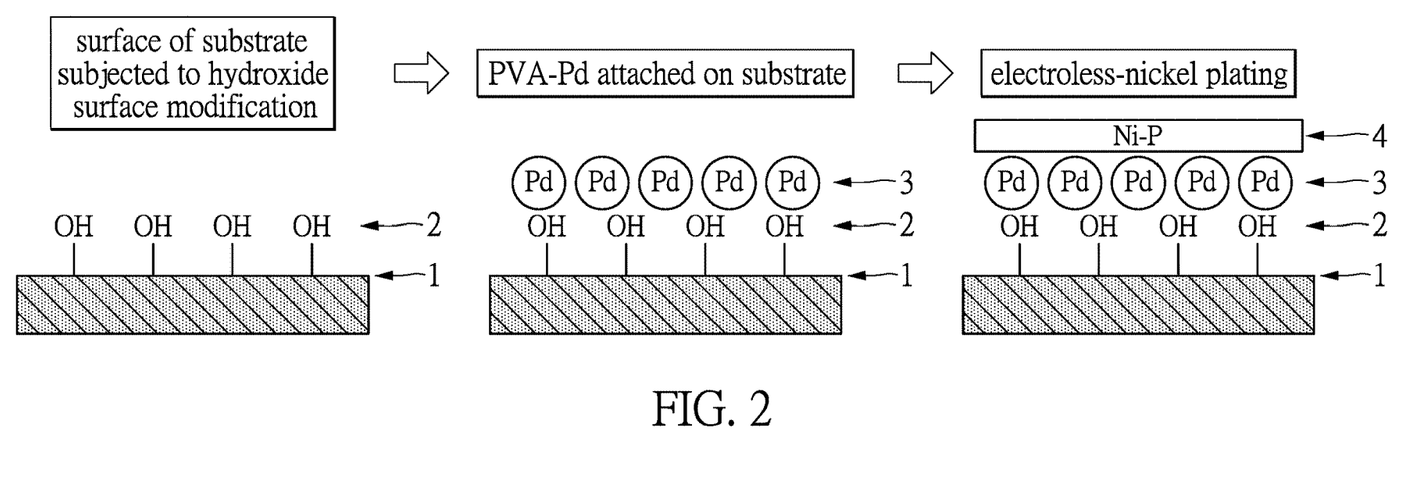
FIG. 2 shows a manufacturing flow chart of the method for no-silane electroless metal deposition using high adhesive catalyst of the first embodiment in the instant disclosure.
Figure 3:
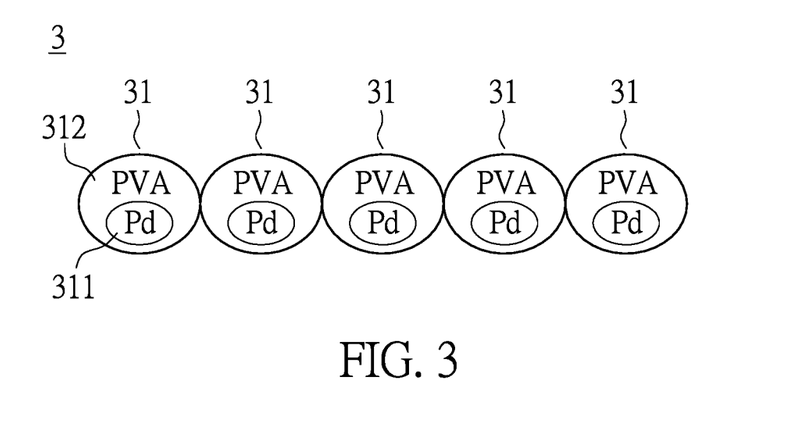
FIG. 3 shows a schematic view of a structure of a colloidal nanoparticle of the first embodiment in the instant disclosure.
Figure 4:
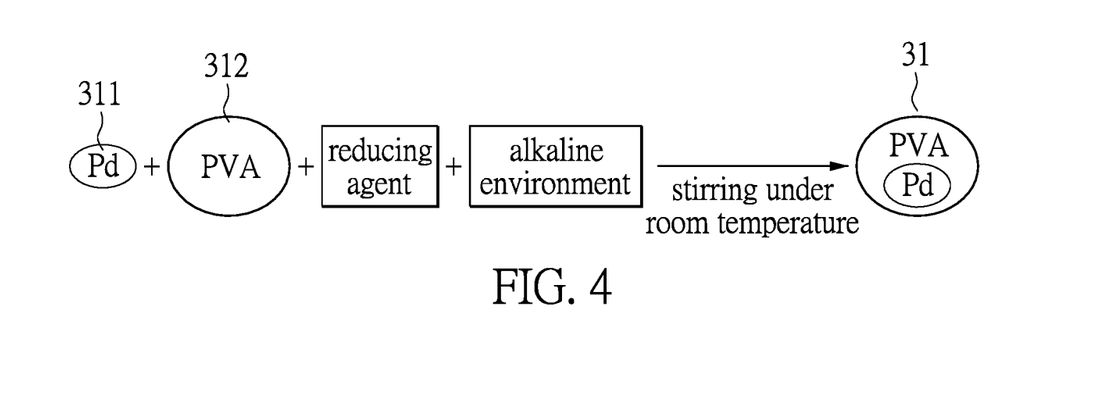
FIG. 4 shows a manufacturing flow chart of a method for forming colloidal nanoparticles being used in no-silane electroless metal deposition of the first embodiment in the instant disclosure.

Please refer to FIGS. 1 to 4. FIG. 1 shows a schematic view of a method for no-silane electroless metal deposition using high adhesive catalyst of a first embodiment in the instant disclosure, FIG. 2 shows manufacturing flow chart of a method for no-silane electroless metal deposition using high adhesive catalyst of a first embodiment in the instant disclosure, FIG. 3 shows a schematic view of a structure of a colloidal nanoparticle of a first embodiment in the instant disclosure, and FIG. 4 shows a manufacturing flow chart of a method for forming colloidal nanoparticles being used in no-silane electroless metal deposition of a first embodiment in the instant disclosure. Via the above figures, the embodiment of this instant disclosure provides a method for no-silane electroless metal deposition using high adhesive catalyst, which includes the following steps.

Please refer to FIGS. 1 to 3. The method for no-silane electroless metal deposition using the high adhesive catalyst of the first embodiment includes three steps: conducting a hydroxide surface modification on a surface of a substrate 1 to form a chemical oxide layer 2, forming a catalyst layer 3 on the chemical oxide layer 2, and conducting an electroless metal deposition to form an electroless metal layer 4.

Firstly, a substrate 1 (a silicon substrate is illustrated in the instant disclosure) is provided, and the substrate 1 is cleaned using an RCA cleaning method. The RCA cleaning method is a standard procedure for wet cleaning in the industry. RCA-1 and RCA-2 are two reagents used in the RCA cleaning method. The ingredients of RCA-1 are $NH_4OH$, $H_2O_2$, and $H_2O$ (also known as APM), and the RCA-1 is used to remove organic particles on a surface. The ingredients of RCA-2 are HCl, $H_2O_2$, and $H_2O$ (also known as HPM), and the RCA-2 is used to remove metals on a surface. In the instant disclosure, an APM solution of the RCA cleaning method is used in the cleaning procedure to clean the organic particles on the surface. The cleaning procedure includes the following steps. The substrate 1 is soaked in the APM solution for 20 minutes at 80° C., and the APM solution has a ratio of $NH_4OH:H_2O_2:DI=1:1:5$ (DI is deionized water). After being cleaned, the substrate 1 is then soaked into a 2% hydrofluoric acid (HF) aqueous solution to remove an oxide layer formed in the RCA cleaning method on the surface. Then, a sulfuric peroxide mixture (SPM), or an ozone is used to conduct a hydroxide surface modification on a surface of the substrate 1, and the substrate 1 is soaked into the SPM ($H_2SO_4$—$H_2O_2$) with a volume ratio of 3:1 for 10 minutes, so as to hydroxylate the surface of the substrate 1 and to form an uniform and hydroxylated chemical oxide layer 2 on the surface (as shown in the leftmost figure of FIG. 2). Wherein, the SPM also can be replaced with ozone ($O_3$), nitrate ($HNO_3$), or a mixture of nitrate ($HNO_3$) and hydrofluoric acid (HF; 500 ppm). In other words, a modifying agent to form the chemical oxide layer 2 can be selected from the group consisting of: ozone, nitrate, hydrofluoric acid, mixture of sulfuric acid and hydrogen peroxide, and mixture of nitrate and hydrofluoric acid. After taking out the substrate 1 from the SPM, the surface of the substrate 1 is rinsed using deionized water.

Next, the surface modified substrate 1 is soaked in a PVA-Pd (polyvinyl alcohol polymer-palladium) solution for 5 minutes at 40° C., and the PVA-Pd is attached to the chemical oxide layer 2 of the surface of the substrate 1, so as to form a catalyst layer 3 (as shown in the middle figure of FIG. 2). The PVA-Pd solution may be prepared by the following steps: 0.285 g of polyvinyl alcohol polymer (PVA) 312 is dissolved in the 44 ml of deionized water, a precursor containing Pd ions ($Pd(NO_3)_2.2H_2O$, 0.329 g) is dissolved in the polyvinyl alcohol polymer (PVA) solution. The solution becomes brown. And a 1 ml of formaldehyde solution is used as a reducing agent and added therein. A 5 ml of $Na_2CO_3$ (1 M) solution is then slowly added in the above solution, and the solution is completely prepared when the color of solution turns from brown to black.

Please refer to FIG. 3. FIG. 3 shows a schematic view of a structure of a colloidal nanoparticle of a first embodiment in the instant disclosure. The catalyst layer 3 includes a protective agent and a precursor. The protective agent is at least one polyvinyl alcohol polymer (PVA) 312 and the precursor is at least one palladium nanoparticle (Pd) 311, and the at least one polyvinyl alcohol polymer 312 encapsulates the at least one palladium nanoparticle 311 to form at least one colloidal nanoparticle 31, wherein each of the colloidal nanoparticles 31 has a particle size ranging from 6 nm to 10 nm. Specifically, the at least one palladium nanoparticle (Pd) 311 is completely encapsulated by the at least one polyvinyl alcohol polymer (PVA) 312. When the palladium exists in an aqueous solution with a nanometer scale, the palladium has a relatively large surface area to improve an effect of electroless metal deposition. However, with the particle size having a nanometer scale, the nanoparticles tend to aggregate together, which may cause the substrate 1 to have an uneven surface with these aggregated nanoparticles. Therefore, in this embodiment, the particle size of each of the colloidal nanoparticles 31 is controlled in a ranging from 6 nm to 10 nm, so the colloidal nanoparticles 31 may be evenly separated. The protective agent and the precursor in the catalyst layer 3 may have a weight ratio of 0.5:1 to 2:1, for example, 1:1. That is, the at least one polyvinyl alcohol polymer 312 and the at least one palladium nanoparticle 311 have the weight ratio of 0.5:1 to 2:1, for example, 1:1. The at least one polyvinyl alcohol polymer 312 could be a low-degree-polymerization polyvinyl alcohol polymer with its weight-average molecular weight (Mw) ranging from 20000 to 30000, and the alcoholysis degree of polyvinyl alcohol polymer 312 could be 80% to 90%, for example, 88%.

Then, as shown in FIG. 2, an electroless metal deposition is conducted to deposit a metal on the catalyst layer 3 to form an electroless metal layer 4 (as shown in the rightmost figure of FIG. 2), wherein the metal being deposited on the catalyst layer 3 to form the electroless metal layer 4 may be nickel or copper. Nickel (Ni) is used as an example in the embodiment of the instant disclosure. Specifically, the electroless metal deposition includes the following steps. A composite layer containing the abovementioned substrate 1, chemical oxide layer 2, and catalyst layer 3 is soaked into an electroless nickel plating solution having a pH of 4.9 at 80° C., so as to conduct the electroless metal deposition for 1 minute to form the electroless metal layer 4.

Please refer to FIG. 4. A method for forming colloidal nanoparticles 31 being used to a no-silane electroless metal deposition in this embodiment includes: at least one precursor, at least one protective agent, a reducing agent, and an alkaline environment are provided and stirred at room temperature to form the colloidal nanoparticles 31. The precursor is at least one palladium nanoparticles 311 and the protective agent is at least one polyvinyl alcohol polymer 312. The reducing agent is a formaldehyde solution that can reduce each of the palladium nanoparticles 311 into zerovalent, such that each of the palladium nanoparticles 311 has a catalytic activity. Since the reducing agent performs different roles in an acidic environment and in an alkaline environment, the formaldehyde solution of the reducing agent in this embodiment is used in the alkaline environment, and the palladium nanoparticles 311 are reduced into zero-valent and have the catalytic activity.

Each of the colloidal nanoparticles 31 of this embodiment is such that, at least one protective agent encapsulates at least one precursor. Specifically, the protective agent is at least one polyvinyl alcohol polymer 312 and the precursor is at least one palladium nanoparticle 311, and the at least one polyvinyl alcohol polymer 312 encapsulates the at least one palladium nanoparticle 311 to form at least one colloidal nanoparticle 31 as shown in FIG. 3.

Each of the colloidal nanoparticles 31 of this embodiment has a particle size ranging from 6 nm to 10 nm, and the protective agent and the precursor in each of the colloidal nanoparticles 31 have a weight ratio of 0.5:1 to 2:1, for example, 1:1. The at least one polyvinyl alcohol polymer 312 could be a low-degree-polymerization polyvinyl alcohol polymer with its weight-average molecular weight ranging from 20000 to 30000, and the alcoholysis degree of polyvinyl alcohol polymer 312 could be 80% to 90%, for example, 88%.

Second Embodiment

Figure 5:
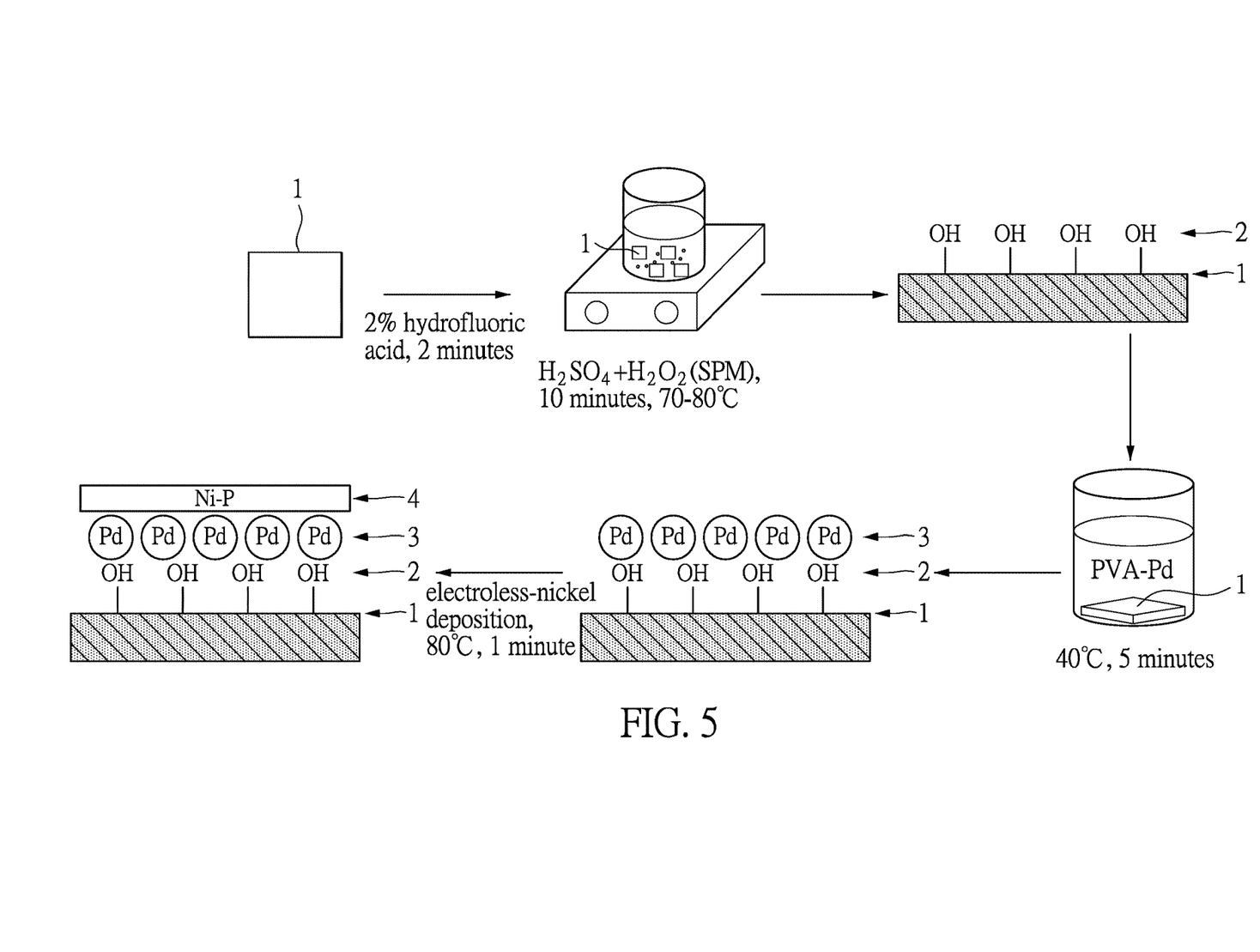
FIG. 5 shows a method of hydroxide surface modification and electroless-nickel plating of a second embodiment in the instant disclosure.

Please refer to FIG. 5. FIG. 5 shows a method of hydroxide surface modification and electroless-nickel plating of a second embodiment in the instant disclosure. In this embodiment, a SPM method is used to conduct the hydroxide surface modification on the surface of the substrate 1, and includes the steps of rinsing, soaking, and electroless-nickel deposition. The steps are described in detail as below.

1) Rinsing: firstly, after being cleaned, the substrate 1 is placed into the 2% hydrofluoric acid (HF) aqueous solution for 2 minutes to remove an oxide layer which is generated in the RCA cleaning process and/or generated naturally. Subsequently, the substrate 1 is soaked into the SPM with a volume ratio of $H_2SO_4:H_2O_2$ being 3:1 for 10 minutes at about 70° C. to 80° C., so as to conduct the hydroxide surface modification on the surface of the substrate 1 to form an uniform and hydroxylated chemical oxide layer 2 on the surface of the substrate 1. In the second embodiment, the SPM also can be replaced with ozone ($O_3$), nitrate ($HNO_3$), or a mixture of nitrate ($HNO_3$) and hydrofluoric acid (HF; 500 ppm).

2) Soaking: after the chemical oxide layer 2 formed substrate 1 is taken out from the SPM, the surface of the substrate 1 of the chemical oxide layer 2 is rinsed with deionized water, and the chemical oxide layer 2 formed substrate 1 is soaked in the PVA-Pd solution for 5 minutes at 40° C., such that a center of the palladium of the PVA-Pd may interact with hydroxyl groups and the PVA-Pd may absorb on the surface of the substrate 1 of the chemical oxide layer 2, so as to form a catalyst layer 3.

3) Electroless-nickel deposition: the chemical oxide layer 2 and catalyst layer 3 formed on the substrate 1 is placed into the electroless nickel plating solution having a pH of 4.9 (or about pH of 4.5 to 5.0) at 80° C. (or about 75° C. to 85° C.) to conduct the electroless metal deposition for 1 minute. During the process of electroless metal deposition, the catalyst PVA-Pd on the surface of the chemical oxide layer 2 and catalyst layer 3 formed on the substrate 1 may effectively decrease an active energy which is required for a reaction, so as to facilitate hypophosphite ions and nickel ions to generate redox reactions on the surface of the chemical oxide layer 2 and catalyst layer 3 formed on the substrate 1, and an electroless nickel phosphorus layer (electroless metal layer 4) with approximately 200 nm thickness may be deposited.

The 200 nm thickness of electroless metal layer 4 on the substrate 1 may not be enough for some applications. Therefore, after the electroless metal layer 4 being formed on the substrate 1 according to the instant disclosure, additional process like conventional electro-plating process may also be performed to the substrate 1 so as to deposit more metal onto the metal layer and increase the thickness of the metal layer to meet the needs of some applications.

The preparation method of the PVA-Pd solution in this embodiment may be identical to that in the first embodiment, thus it is not repeated herein.

The method for forming the colloidal nanoparticle 31 in this embodiment may be identical to that in the first embodiment. In addition, the PVA is used as an example in the first embodiment. In this embodiment, the polymer used to encapsulate the palladium nanoparticle may include but not limited to a polyvinyl alcohol polymer, a polyvinyl alcohol acid polymer, a poly(vinyl alcohol-co-ethylene) polymer, or a poly(vinyl butyral-co-vinyl alcohol-co-vinyl acetate) polymer.

Third Embodiment

Figure 6:
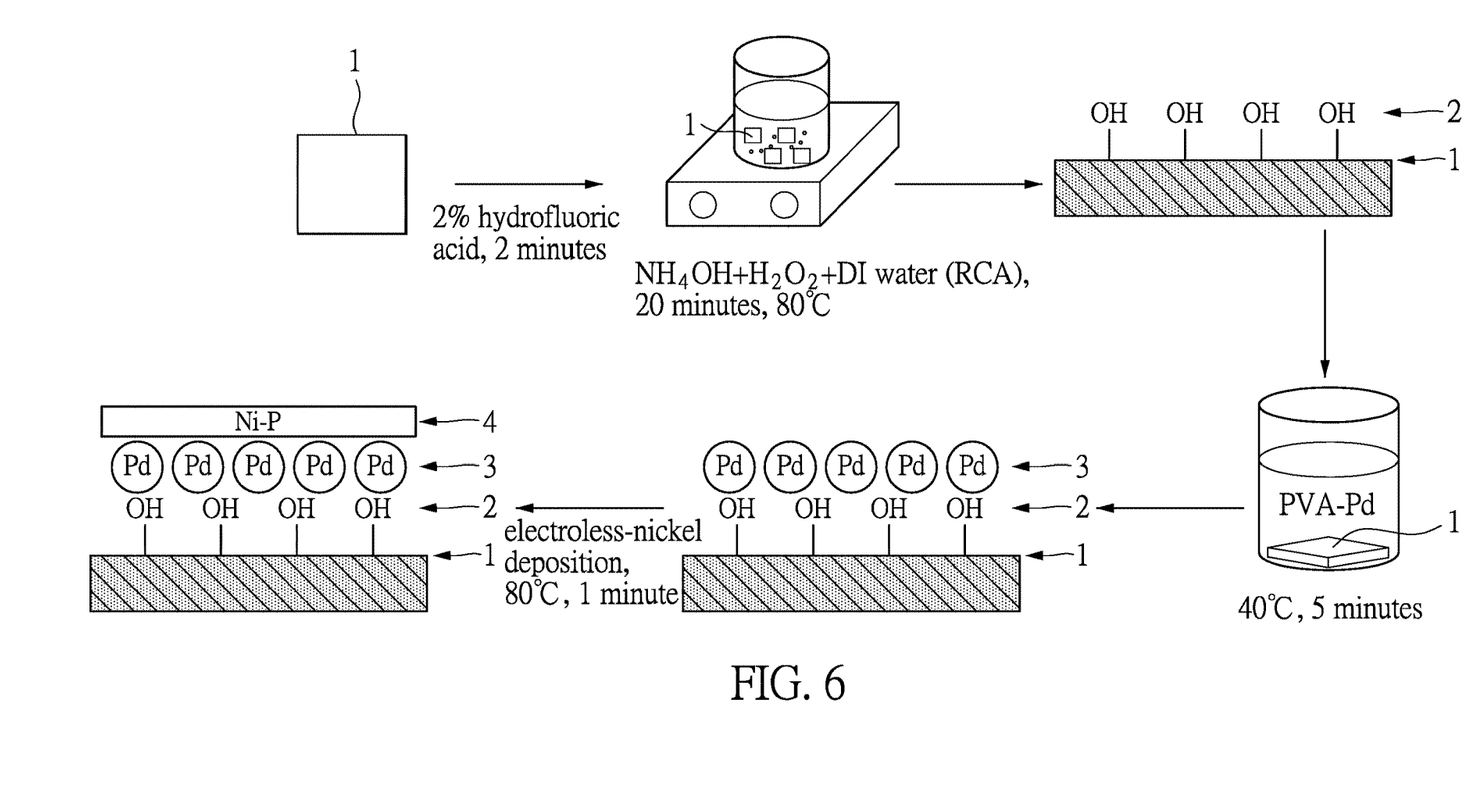
FIG. 6 shows a method of hydroxide surface modification and electroless-nickel plating of a third embodiment in the instant disclosure.

In the third embodiment, the steps of the method for no-silane electroless metal deposition using the high adhesive catalyst are identical to that of the second embodiment, and also include main three steps: conducting a hydroxide surface modification on a surface of a substrate 1 to form a chemical oxide layer 2, forming a catalyst layer 3 on the chemical oxide layer 2, and conducting an electroless metal deposition to form an electroless metal layer 4. A silicon substrate is also illustrated as the substrate 1. The cleaning method of the substrate 1, the composition of the catalyst layer 3, the electroless metal deposition steps, the method for forming the colloidal nanoparticles 31 being used to the no-silane electroless metal deposition, and the composition of the colloidal nanoparticles 31 may all be identical to those of the second embodiment, thus they are not repeated herein. The difference between the third embodiment and the second embodiment is that, in the third embodiment, a RCA method is used for conducting the hydroxide surface modification on the surface of the substrate 1.

FIG. 6 shows a method of hydroxide surface modification and electroless-nickel plating of a third embodiment in the instant disclosure. The RCA method is used to conduct the hydroxide surface modification on the surface of the substrate 1, and includes the steps of rinsing, soaking, and electroless-nickel deposition. The steps are described in detail as below.

1) Rinsing: after a cleaning process, the substrate 1 is placed into a 2% hydrofluoric acid (HF) aqueous solution for 2 minutes to remove an oxide layer which is generated in the RCA cleaning process and/or generated naturally. The substrate 1 is soaked into a solvent with a volume ratio of $NH_4OH:H_2O_2$:DI-water being 1:1:5 for 20 minutes at 80° C., so as to conduct the hydroxide surface modification on the surface of the substrate 1 to form a hydroxylated chemical oxide layer 2 on the surface of the substrate 1.

2) Soaking: the substrate 1 is soaked into the PVA-Pd solution for 5 minutes at 40° C., such that a center of the palladium of the PVA-Pd can interact with the hydroxyl groups and the PVA-Pd absorb onto the surface of the substrate 1 of the chemical oxide layer 2, so as to form a catalyst layer 3. The preparation method of the PVA-Pd solution in this embodiment can be identical to that in the first and second embodiments, thus it is not repeated herein.

3) Electroless-nickel deposition: the chemical oxide layer 2 and catalyst layer 3 formed substrate 1 is placed into the electroless nickel plating solution having a pH of 4.9 (or about pH of 4.5 to 5.0) at 80° C. (or about 75° C. to 85° C.) to conduct the electroless metal deposition for 1 minute. During the process of electroless metal deposition, the catalyst PVA-Pd on the surface of the chemical oxide layer 2 and catalyst layer 3 formed substrate 1 can effectively decrease an active energy which is required for a reaction, so as to facilitate hypophosphite ions and nickel ions to generate redox reactions on the surface of the chemical oxide layer 2 and catalyst layer 3 formed on the substrate 1, and an electroless nickel phosphorus layer (electroless metal layer 4) with approximately 200 nm thickness is deposited.

The 200 nm thickness of electroless metal layer 4 on the substrate 1 may not be enough for some applications. Therefore, after the electroless metal layer 4 being formed on the substrate 1 according to the instant disclosure, additional process like conventional electro-plating process may also be performed to the substrate 1 so as to deposit more metal onto the metal layer and increase the thickness of the metal layer to meet the needs of some applications.

In the third embodiment, the RCA method is used to conduct the hydroxide surface modification on the surface of the substrate 1, but in other embodiments, it also can be replaced with a sulfuric peroxide mixture method, an ozonation method, a hydrogen plasma method, or a nitric acid method. In addition, while the PVA is used as an example in the third embodiment, however, the polymer used to encapsulate the palladium nanoparticle may also include but not limited to a polyvinyl alcohol polymer, a polyvinyl alcohol acid polymer, a poly(vinyl alcohol-co-ethylene) polymer, or a poly(vinyl butyral-co-vinyl alcohol-co-vinyl acetate) polymer.

According to the embodiments mentioned previously, the substrate 1 is cleaned by the RCA cleaning method so as to remove organic particles and metals attached onto the surface of the substrate 1. After the RCA cleaning method, some hydroxide groups may be formed on the surface of the substrate 1. However, the hydroxide groups formed during the RCA cleaning method are not uniform because the cleaning to the substrate 1 and the formation of the hydroxide groups happens at the same time, and the organic particles and metals attached onto the substrate 1 would negatively impact the formation of the hydroxide groups.

Therefore, the method for no-silane electroless metal deposition of the present disclosure further includes the steps of applying a hydrofluoric acid onto the substrate and then applying a modifying agent onto the substrate. In the step of applying a hydrofluoric acid onto the substrate, the hydrofluoric acid can remove the hydroxide groups formed by RCA cleaning method. In the step of applying a modifying agent onto the substrate, the modifying agent can modify the surface of the substrate 1 with new hydroxide groups to form a uniform and hydroxylaye chemical oxide layer 2.

Via the method for no-silane electroless metal deposition using the high adhesive catalyst can achieve the following experimental results.

<Experimental Result 1: XPS Spectrum Analysis>

Figure 7A:
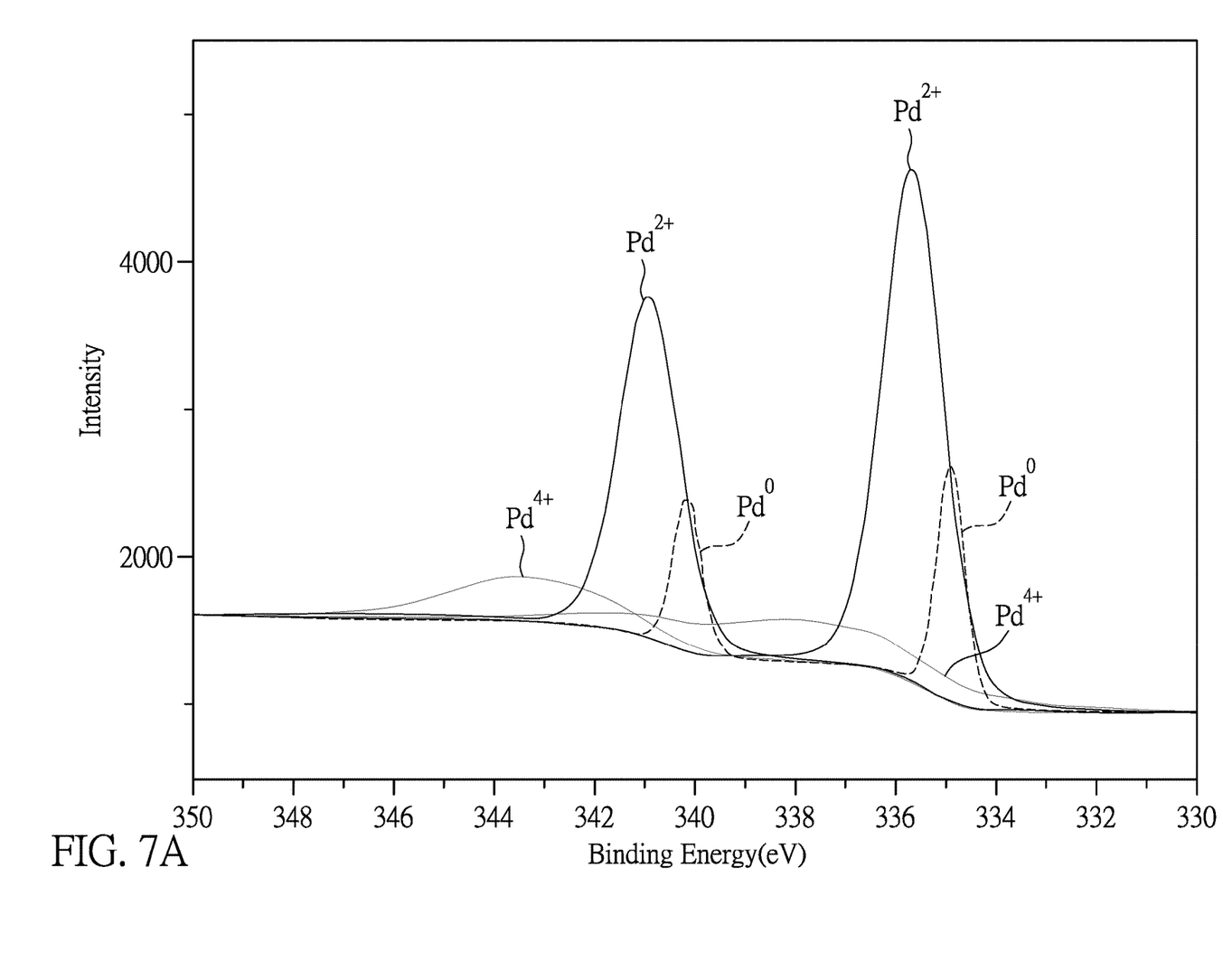
FIG. 7A shows a result of XPS spectrum analysis of a substrate without conducting a hydroxide surface modification of an embodiment in the instant disclosure.
Figure 7B:
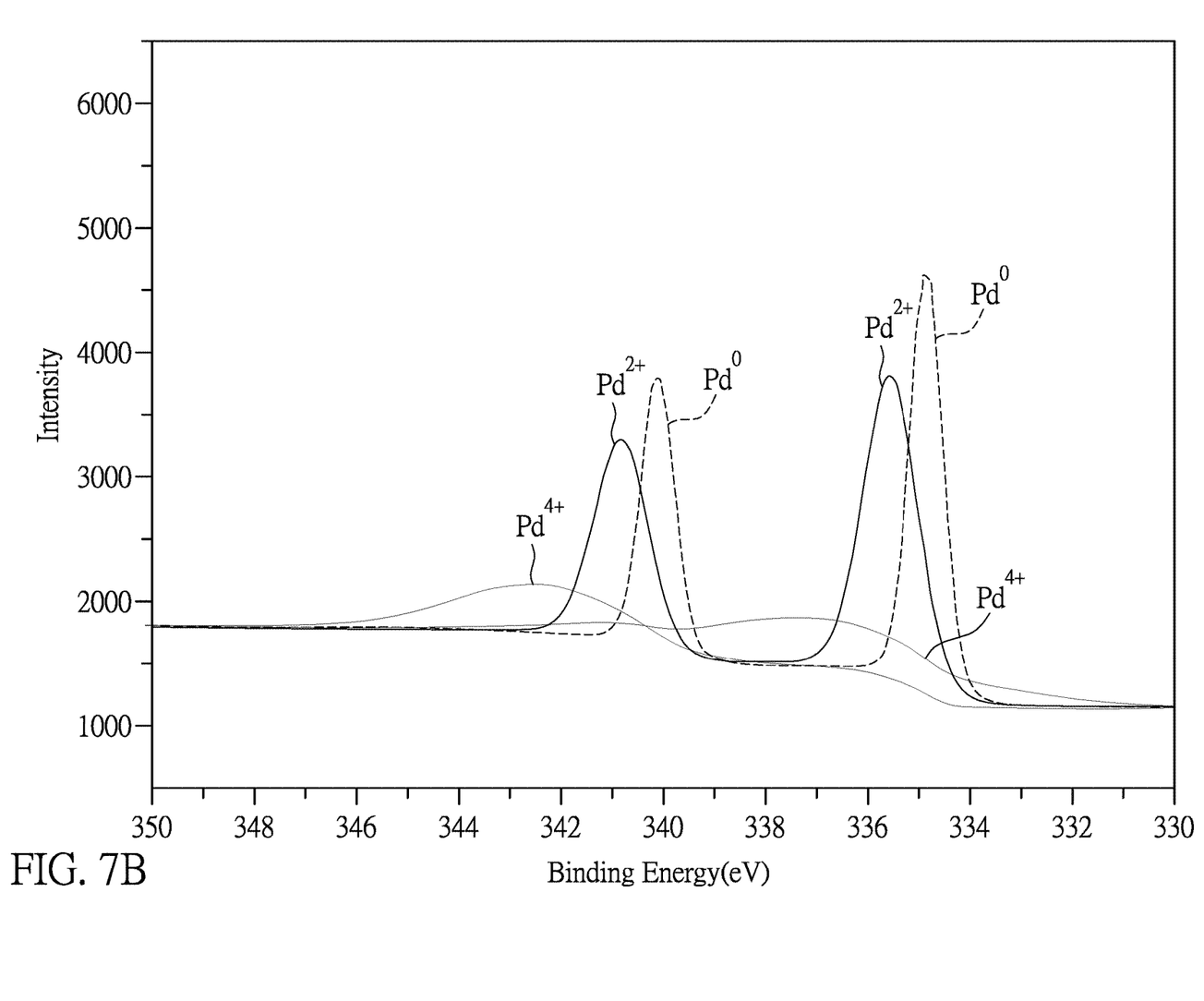
FIG. 7B shows a result of XPS spectrum analysis of a substrate after conducting a hydroxide surface modification of an embodiment in the instant disclosure.

Please refer to FIGS. 7A and 7B. FIG. 7A shows a result of XPS spectrum analysis of a substrate without conducting a hydroxide surface modification, and FIG. 7B shows a result of XPS spectrum analysis of a substrate after conducting a hydroxide surface modification. In these figures, along the cross axis, the greater the left is, the greater the value will be. On the contrary, the greater the right is, the smaller the value will be. The principle of the XPS (X-ray Photoelectron Spectroscopy) spectrum analysis is, while a palladium atom from the bivalent ($Pd^{2+}$) becomes zero valent ($Pd^0$), electrons (negative charge) are required therein, and the source of the electrons is the hydroxyl groups generated from the hydroxide surface modified substrate 1. By the XPS spectrum analysis, it can be confirmed that, when the catalyst of palladium contacts with the oxygen, which grab the electrons from the hydroxyl group, so as to form a chemical bond. That is, while the catalyst of palladium contacts with the hydroxide surface modified substrate 1, an interaction is occurred to generate the chemical bond. As shown in FIG. 7A, the $Pd^0$ represented curve, the $Pd^{2-}$ represented curve, and the $Pd^{4+}$ represented curve are all the element forms of the palladium. The $Pd^0$ represented curve shows the catalyst of palladium which is in an atom form with zero valent under normal condition, and the $Pd^{2+}$ represented curve shows the catalyst of palladium which binds to the oxygen of the PVA. FIG. 7A shows an element configuration analysis of the palladium of the PVA-Pd on the substrate 1 without conducting the hydroxide surface modification, in which the $Pd^0$ after fitting is the major signal source, and the $Pd^{4+}$ is the minor signal source. As shown in FIG. 7A, when the substrate 1 was not conducted the hydroxide surface modification and directly bound the catalyst of palladium to the substrate 1, a binding energy of the $Pd^{2+}$ is 336.85 eV, and it is represents the intensity of the $Pd^{2+}$ represented curve is more strength than the intensity of the $Pd^0$ represented curve. There are two reasons of the existence of an oxidation state ($Pd^{2+}$ and $Pd^{4+}$) of Pd are, 1) there is a residual precursor $Pd(NO_3)_2$, and it means the redox reaction is not completed; and 2) there is an interaction generated from an oxygen (O) of a long chain between the Pd and the PVA, and it means the Pd—O between the PVA-Pd forms an extremely strong interaction.

As shown in FIG. 7B, after the substrate 1 is conducted the hydroxide surface modification, the catalyst of palladium is then bound to the substrate 1. FIG. 7B shows that, the peak of the $Pd^0$ represented curve becomes strong but the peak of the $Pd^{2+}$ represented curve becomes weak, and it means the proportion of the $Pd^0$ is increased but the proportion of the $Pd^{2+}$ is decreased. It might have the following two reasons, 1) the hydroxyl group on the surface of the substrate 1 might be as a reducing agent of the $Pd^{2+}$, so as to increase the amount of the $Pd^0$; and 2) the palladium atom reacts with the oxygen (Pd—O) between the surface of the substrate 1 and the PVA generating the interaction with the hydroxyl group on the surface of the substrate 1, such that the oxygen on the substrate 1 provides the electrons, and the palladium atom on the PVA-Pd accepts the electrons to generate an negative offset of the binding energy. Therefore, after the substrate 1 is conducted the hydroxide surface modification, a chemical form of the catalyst of palladium on the substrate 1 is significantly changed. In addition, after the substrate 1 is conducted the hydroxide surface modification, the oxygen of the hydroxyl group of the substrate 1 binds to the catalyst of palladium, and its binding manner is similar to the binding manner of silane compound. The binding manner of silane compound is, an electron pair of nitrogen of the silane compound interacts with the palladium atom to increase the electron density of palladium, and the binding energy is decreased at this time. Depending on the above silane compound similar binding manner, in FIG. 7B in this instant disclosure, the oxygen of the hydroxyl group of the substrate 1 binding to the catalyst of palladium results that, the peak of the $Pd^0$ represented curve becomes large and the peak of the $Pd^{2+}$ represented curve becomes small. When the peak of the $Pd^0$ represented curve is stronger, it shows the atom form of palladium has been changed, and it means after the substrate 1 is conducted the hydroxide surface modification, the bonds generated therefrom cause the change of the atom form of palladium, and it further means the bonds have been successfully generated between the catalyst of palladium and the substrate 1.

<Experimental Result 2: Water Droplet Contact Angle (Hydrophilicity) Experiment>

Figure 8A:
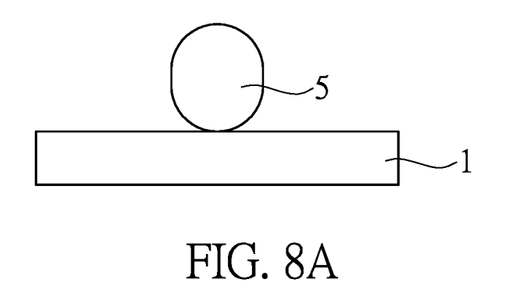
FIG. 8A to 8C show a result of a substrate conducting a water droplet contact angle experiment of an embodiment in the instant disclosure.
Figure 8B:
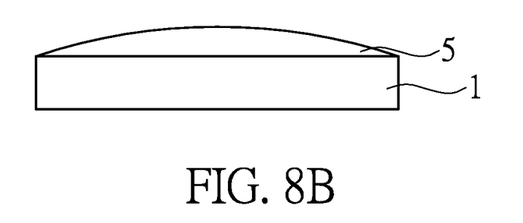
Figure 8C:
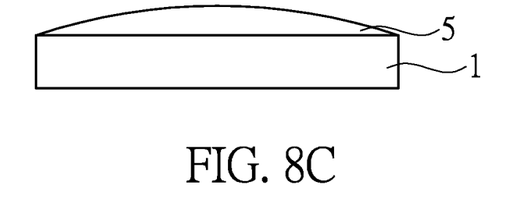

In order to understand a degree of change of the hydrophilicity of the surface of the substrate 1 after which is conducted the SPM method in the second embodiment and the RCA method in the third embodiment in this instant disclosure, the water droplet contact angle experiment is used for measurement. Please refer to FIGS. 8A to 8C. FIG. 8A to 8C show a result of a substrate conducting a water droplet contact angle experiment. FIG. 8A shows the surface of the substrate 1 is only rinsed with the hydrofluoric acid (HF) aqueous solution but without subjected to the hydroxide surface modification. FIG. 8B shows the surface of the substrate 1 is subjected to the hydroxide surface modification using the SPM method. FIG. 8C shows the surface of the substrate 1 is subjected to the hydroxide surface modification using the RCA method. In this instant disclosure, the water droplet contact angle experiment is used to confirm the substrate 1 has been successfully subjected to the hydroxide surface modification. The principle of the water droplet contact angle experiment is, if the substrate 1 was not subjected to the hydroxide surface modification, when a water droplet 5 is dropped on the substrate 1 (e.g., silicon substrate), a ball shape is represented (the water droplet 5 and the substrate 1 have an angle about 90 degrees), that is the substrate 1 has a hydrophobic property, thus the water droplet 5 cannot spread on the substrate 1; and if the substrate 1 was subjected to the hydroxide surface modification, when the water droplet 5 is dropped on the substrate 1, at this time, the water droplet 5 can spread on the substrate 1, that is the substrate 1 has been successfully subjected to the hydroxide surface modification and there are the hydroxyl groups on its surface, such that the surface of the substrate 1 has a hydrophilic property so as to facilitate binding to the catalyst of palladium. As shown in FIG. 8A, when the water droplet 5 was dropped on the surface of the substrate 1 which has not been subjected to the hydroxide surface modification, the angle between the water droplet 5 and the substrate 1 is 93 degrees. In FIG. 8B and FIG. 8C, when the surface of the substrate 1 has been subjected to the hydroxide surface modification using the SPM method and the RCA method respectively, when the water droplet 5 was dropped on the surface of the substrate 1, the water droplet 5 on the surface was spread out immediately, and the angle between the water droplet 5 and the substrate 1 is smaller than 5 degrees. Therefore, after conducting the hydroxide surface modification on the surface of the substrate 1 by the SPM method in the second embodiment and the RCA method in the third embodiment, a lots of hydroxyl groups are generated on the surface of the substrate 1 to increase the hydrophilicity property of the surface of the substrate 1.

<Experimental Result 3: Electroless Nickel Layer Adhesion Experiment>

Figure 9:
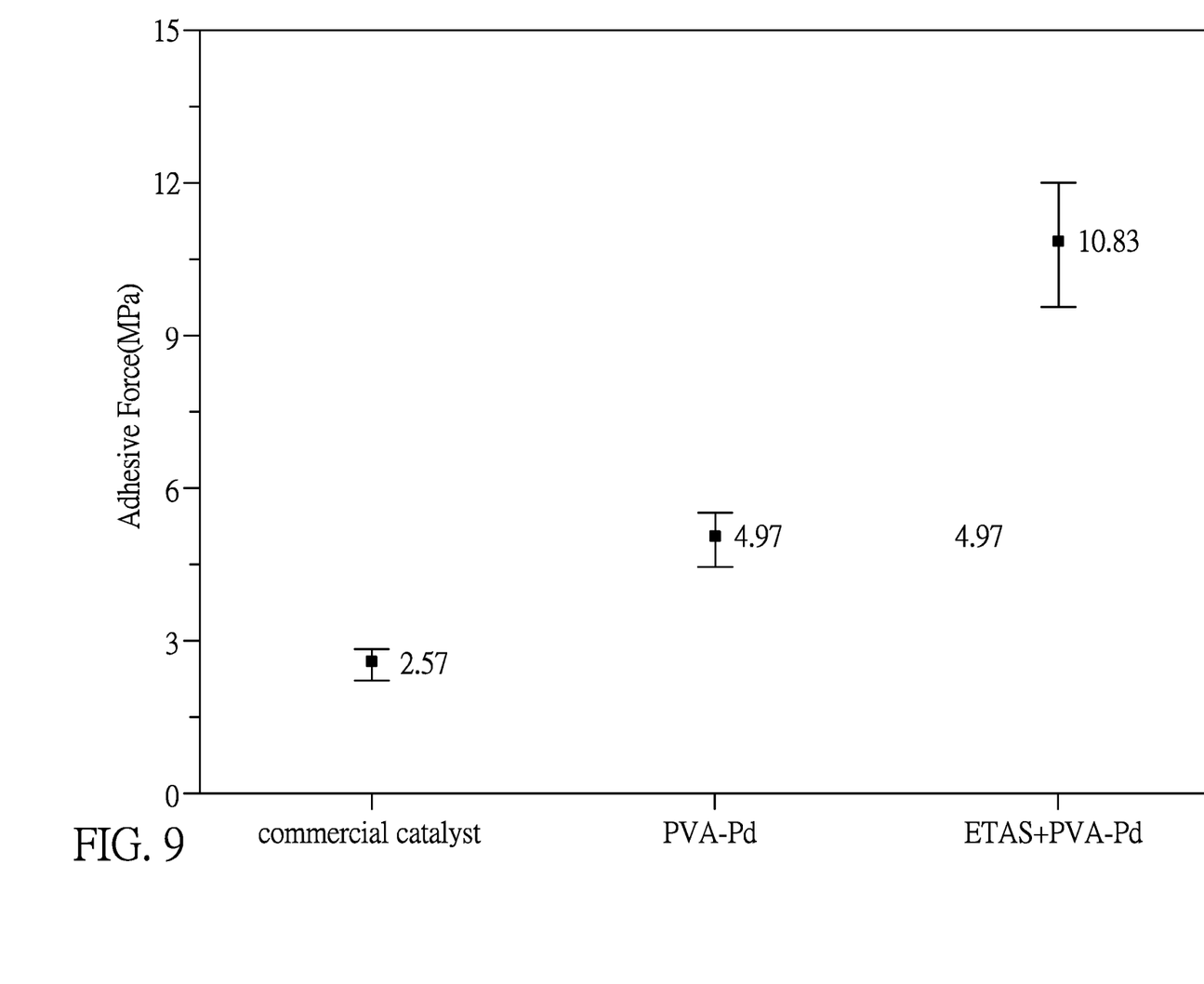
FIG. 9 shows a result of a test of adhesive force between an electroless nickel layer and a substrate of an embodiment in the instant disclosure.

Please refer to FIG. 9. FIG. 9 shows a result of a test of adhesive force between an electroless nickel layer and a substrate in the instant disclosure. After the step of conducting the hydroxide surface modification on the substrate 1 to form the catalyst layer 3 having a high adhesive property, a metal nickel is deposited on the catalyst layer 3 to conduct the step of electroless metal deposition to form the electroless metal layer 4, and the electroless nickel layer adhesion experiment is used to test a performance of an adhesive force between the metal nickel and the substrate 1. The experimental result shows in FIG. 9, the value in FIG. 9 is the result of repeating each of the condition for five times under the identical manufacturing process. Firstly, the commercial catalyst in the leftmost of the figure represents the result of the performance of the adhesive force of the electroless nickel layer of the commercial catalyst on the substrate 1 which has been not subjected to the hydroxide surface modification. The PVA-Pd in the middle of the figure represents the performance of the adhesive force of the electroless nickel layer cooperated with the PVA-Pd on the substrate 1 which has been subjected to the hydroxide surface modification. The ETAS+PVA-Pd in the rightmost of the figure represents the performance of the adhesive force of the surface of an ETAS modified substrate 1 cooperated with the PVA-Pd. As shown in FIG. 9, an average value of the adhesive force of the electroless nickel layer on which the commercial catalyst is used on the substrate 1 which has not been subjected to the hydroxide surface modification is 2.57 MPa. An average value of the adhesive force of the electroless nickel layer on which the PVA-Pd is used on the substrate 1 which has been subjected to the hydroxide surface modification is 4.97 MPa. An average value of the adhesive force of the electroless nickel layer on which the PVA-Pd is used on the substrate 1 which has been subjected to the ETAS modification is 10.83 MPa. Although the adhesive force of the electroless nickel layer of the PVA-Pd group is lower than the adhesive force of the electroless nickel layer of the ETAS+PVA-Pd group, however, compared to the commercial catalyst group, the adhesive force of the electroless nickel layer of the PVA-Pd group is about two times higher than that. That is, when the catalyst of palladium has chemically bound to the hydroxyl groups on the substrate 1, the adhesive force is increased. In addition, the substrate 1 subjected to the hydroxide surface modification being cooperated with the electroless nickel layer of the PVA-Pd can simplify and speed up the manufacturing process, and the problem of an ETAS residual carbon layer obstructing a diffusion of the surface of the metal layer in the subsequent annealing treatment. Thus, it is suitable to use for improving the adhesive force of the electroless nickel layer. In summary, the beneficial effects of the instant disclosure are, by the method for no-silane electroless metal deposition using the high adhesive catalyst provided from the embodiment of the instant disclosure, the catalyst having high adhesion property is used to replace the silane compound in the electroless metal deposition process, and the catalyst also has the function of being used as a bridge between organic and inorganic materials like the silane compound. Due to the fact that the high adhesive catalyst does not generate resistance and the manufacturing process is easier, the abovementioned problems can be successfully solved.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A method for electroless metal deposition, comprising:
    a) cleaning a substrate, applying a hydrofluoric acid onto the substrate, and then applying a modifying agent onto the substrate to form a chemical oxide layer on the substrate;
    b) forming a catalyst layer on the chemical oxide layer, wherein the catalyst layer includes a plurality of colloidal nanoparticles, and each of the plurality of colloidal nanoparticles includes a palladium nanoparticle and a polymer which encapsulates the palladium nanoparticle, and
    c) depositing a metal on the catalyst layer through an electroless metal deposition to form an electroless metal layer;
    wherein, the polymer and the palladium nanoparticle have a weight ratio of 0.5:1 to 2:1.

2. The method for electroless metal deposition as claimed in claim 1, wherein in the step a), the modifying agent is selected from the group consisting of: ozone, nitrate, hydrofluoric acid, mixture of sulfuric acid and hydrogen peroxide, and mixture of nitrate and hydrofluoric acid.

3. The method for electroless metal deposition as claimed in claim 1, wherein the protective agent is the polymer, and the precursor is a palladium ion.

4. The method for electroless metal deposition as claimed in claim 1, wherein each of the plurality of colloidal nanoparticles has a particle size ranging from 6 nm to 10 nm.

5. The method for electroless metal deposition as claimed in claim 1, wherein the polymer encapsulating the palladium nanoparticle is a polyvinyl alcohol polymer, a polyvinyl alcohol acid polymer, a poly(vinyl alcohol-co-ethylene) polymer, or a poly(vinyl butyral-co-vinyl alcohol-co-vinyl acetate) polymer.

6. The method for electroless metal deposition as claimed in claim 1, wherein the polymer is a low-degree-polymerization polyvinyl alcohol polymer with a weight-average molecular weight ranging from 20000 to 30000.

7. The method for electroless metal deposition as claimed in claim 1, wherein in the step c), the metal deposited on the catalyst layer in the electroless metal deposition is nickel or copper.

8. The method for electroless metal deposition as claimed in claim 1, wherein the colloidal nanoparticles is formed by reacting a precursor, a protective agent, and a reducing agent in an alkaline environment.

9. The method for electroless metal deposition as claimed in claim 8, wherein the precursor is a palladium ion, the protective agent is the polymer, and the reducing agent is a formaldehyde solution.

10. The method for electroless metal deposition as claimed in claim 8, wherein the precursor is at least one palladium nanoparticle, the protective agent is at least one polymer, and the at least one polymer encapsulates the at least one palladium nanoparticle to form at least one colloidal nanoparticle.

11. The method for electroless metal deposition as claimed in claim 10, wherein the at least one polymer encapsulating the at least one palladium nanoparticle is a polyvinyl alcohol polymer, a polyvinyl alcohol acid polymer, a poly(vinyl alcohol-co-ethylene) polymer, or a poly(vinyl butyral-co-vinyl alcohol-co-vinyl acetate) polymer.

12. A method for metal deposition, comprising:
   a) cleaning a substrate, applying a hydrofluoric acid onto the substrate, and then applying a modifying agent onto the substrate to form a chemical oxide layer on the substrate;
   b) forming a catalyst layer on the chemical oxide layer, wherein the catalyst layer includes a plurality of colloidal nanoparticles, and each of the plurality of colloidal nanoparticles includes a palladium nanoparticle and a polymer which encapsulates the palladium nanoparticle, and
   d) conducting an electroless metal deposition to form a metal layer on the catalyst layer;
      wherein, the polymer and the palladium nanoparticle have a weight ratio of 0.5:1 to 2:1.

13. The method of claim 12, wherein the step d) further includes conducting an electro-plating process to increase the thickness of the metal layer.

14. The method of claim 12, wherein the step b) further includes using the polymer and a palladium ion to form the catalyst layer on the chemical oxide layer.

15. An electroless metal layer included substrate, comprising:
   a chemical oxide layer formed on a surface of a substrate by cleaning the substrate, applying a hydrofluoric acid onto the substrate, and then applying a modifying agent onto the substrate;
   a catalyst layer disposed on the chemical oxide layer, and the catalyst layer including a plurality of colloidal nanoparticles, and each of the plurality of colloidal nanoparticles including a palladium nanoparticle and a polymer which encapsulates the palladium nanoparticle, and
   an electroless metal layer formed by conducting an electroless metal deposition to deposit a metal on the catalyst layer;
   wherein, the polymer and the palladium nanoparticle have a weight ratio of 0.5:1 to 2:1.

16. The electroless metal layer included substrate as claimed in claim 15, wherein each of the plurality of colloidal nanoparticles has a particle size ranging from 6 nm to 10 nm.

17. The electroless metal layer included substrate as claimed in claim 15, wherein the polymer encapsulating the palladium nanoparticle includes a polyvinyl alcohol polymer, a polyvinyl alcohol acid polymer, a poly(vinyl alcohol-co-ethylene) polymer, or a poly(vinyl butyral-co-vinyl alcohol-co-vinyl acetate) polymer.

18. The electroless metal layer included substrate as claimed in claim 15, wherein the polymer is a low-degree-polymerization polyvinyl alcohol polymer with its weight-average molecular weight ranging from 20,000 to 30,000.

19. The electroless metal layer included substrate as claimed in claim 15, wherein the metal includes nickel or copper.

* * * * *